July 29, 1952     H. S. ALEXANDER, SR     2,604,811
INSTRUMENT FOR TESTING LATERAL VISUAL ABILITY Filed Dec. 19, 1950     2 SHEETS—SHEET 1

INVENTOR.
HENRY S. ALEXANDER, Sr.

July 29, 1952 — H. S. ALEXANDER, SR — 2,604,811
INSTRUMENT FOR TESTING LATERAL VISUAL ABILITY
Filed Dec. 19, 1950 — 2 SHEETS—SHEET 2
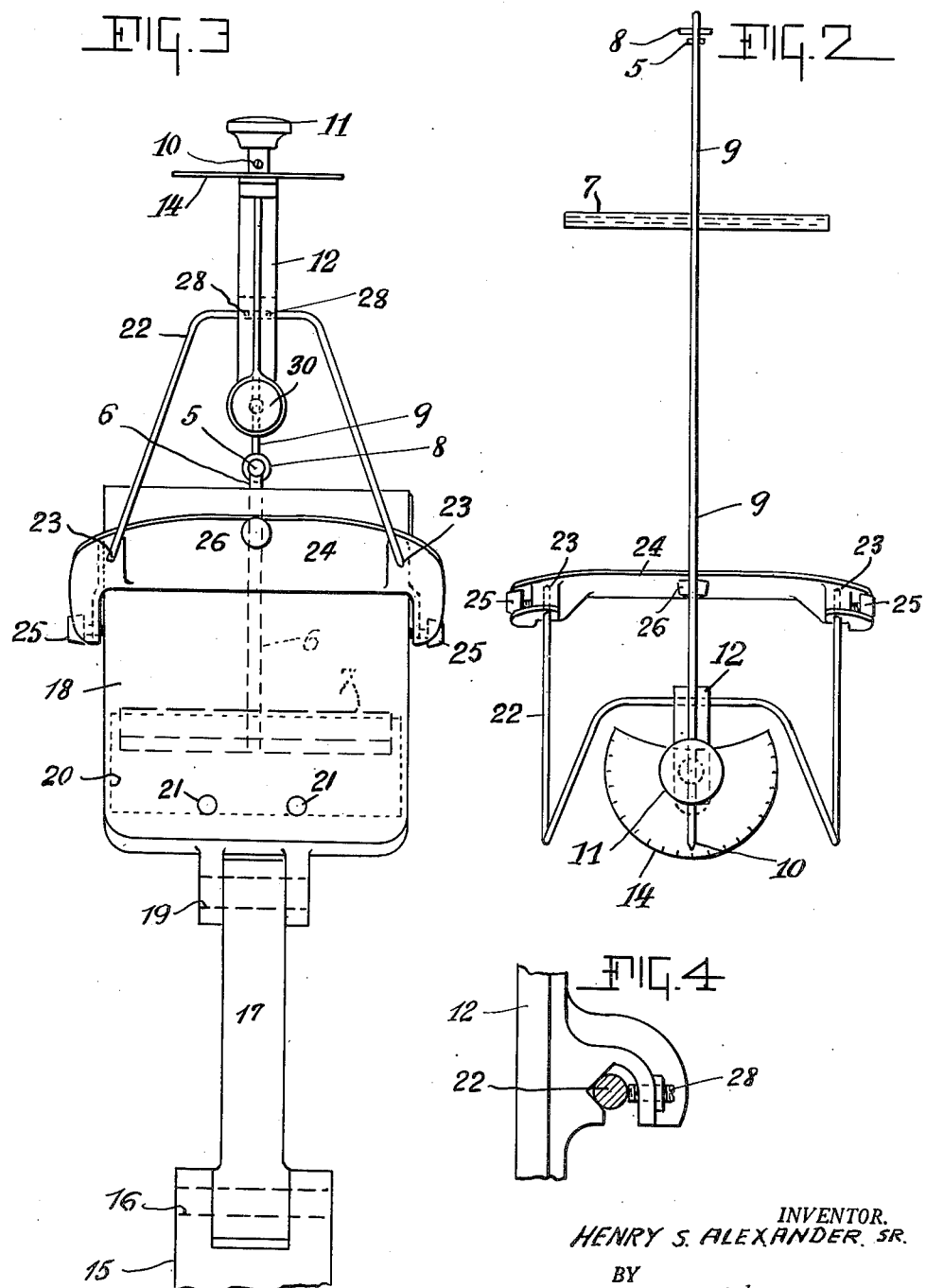
INVENTOR.
HENRY S. ALEXANDER, SR.

Patented July 29, 1952

2,604,811

UNITED STATES PATENT OFFICE 2,604,811

INSTRUMENT FOR TESTING LATERAL VISUAL ABILITY

Henry S. Alexander, Sr., Meadville, Pa., assignor to Keystone View Company, Meadville, Pa., a corporation of Pennsylvania Application December 19, 1950, Serial No. 201,665

1 Claim. (Cl. 88—20)

The object of this invention is to provide an instrument for testing lateral visual ability or side vision. A restricted lateral vision field or so-called side vision is a source of real danger in driving an automobile or in occupations in which it is important or desirable to have perfect or good lateral vision.

The invention is embodied in an instrument which provides a fixed and a laterally movable target in such optical lateral cooperation and arrangement that the extent of the visual field in the horizontal plane of a person being tested may be accurately measured.

Accordingly the invention is embodied in an instrument as hereinafter described and claimed, and as illustrated in the accompanying drawing in which Fig. 1 is a side view of the instrument showing it attached to a vision testing apparatus to be explained hereafter.

Fig. 2 is a plan view of the instrument itself looking in the direction of the arrow 2 in Fig. 1.

Fig. 3 is a front view of Fig. 1 looking in the direction of the arrow therein.

Fig. 4 shows a detail of construction.

Figure 1:
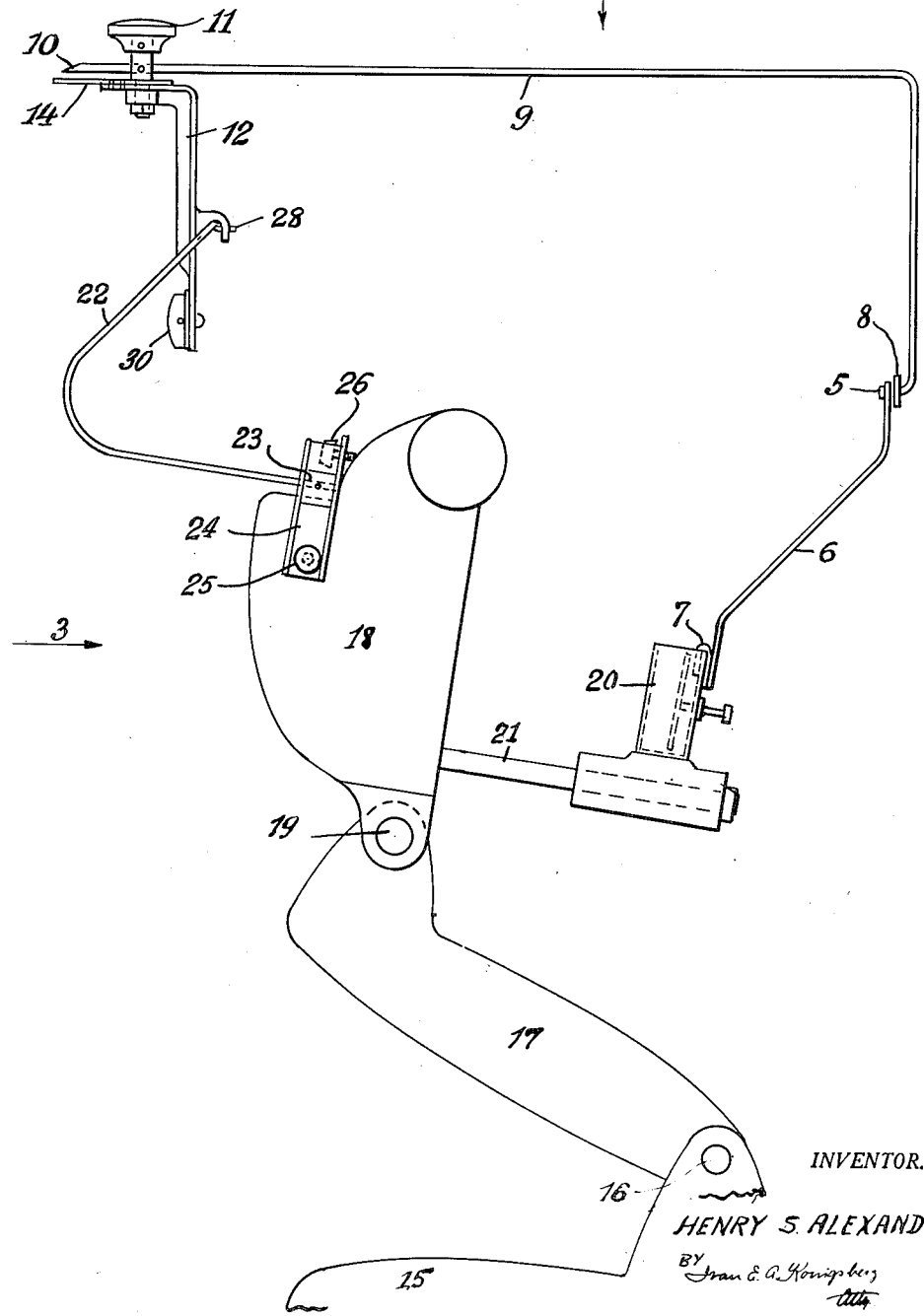

The instrument comprises a fixed target 5 in the form of a small disk carried by a support 6 which is provided with a hook member or similar means 7 for attaching the support 6 to suitable supporting means such as another instrument or a stand. The movable target 8 is also in the form of a small disk, somewhat larger than the fixed target 5. The movable target is carried by an arm 9 having a forwardly extending pointer 10. The arm 9 is carried by and operable by a knob 11 which is rotatably mounted upon a bracket 12. The latter carries a fixed scale member 14 with a scale marked thereon as shown. The bracket 12 may have any form for attaching it to some supporting instrument or stand. A head rest 30 is secured to the bracket.

Although any suitable support or stand may be used for the support of the bracket 12 and the rear support 6 so that the two targets may be arranged in the proper optical testing relation, the invention is herein disclosed as an attachment to and in combination with an optical apparatus for use in visual surveys services of the type disclosed in the U. S. Patent 2,557,608, June 19, 1951.

Such an instrument is used for conducting visual surveys in schools and industries and when a subject is being tested for visual ability in general it is an advantage to test also for lateral visual ability by means of the instrument described herein. The persons who conduct such general vision tests also usually possess the telebinocular instrument and it is therefore practical and useful to arrange the lateral vision testing instrument in such a manner that it may readily be attached to the telebinocular apparatus. The latter also includes certain desirable features which may be taken advantage of in setting up the lateral vision test instrument and using it.

Accordingly, the invention includes means for supporting the lateral vision testing instrument upon the telebinocular apparatus as shown in Figs. 1 and 3. The telebinocular is mounted upon a base 15 to which is pivoted at 16 an arm 17 which in turn supports a lens assembly 18 by means of a pivot 19. The telebinocular includes a target magazine 20 slidably carried on rods 21, 21 and movable thereon from a near point to a far point position. The pivoted arm 17 is so arranged that the lens assembly may be raised and lowered without changing its vertically adjusted position.

The lateral vision test instrument is secured to the lens assembly by means of a bent rod 22, the ends 23 of which are seated or held in a bridge formed bracket 24 secured to the lens assembly housing by screw knobs 25, 25 in vertically adjusted position by a screw knob 26. The aforesaid bracket 12 is secured upon the rod 22 by set screws 28, 28 as shown in Fig. 4. At the rear of the apparatus, the fixed target support hook member 7 is hooked over the edge of the target magazine 20, which is moved to the far point position.

It will therefore be seen that the relative positions of the two target members 5 and 8 become optically correctly fixed by simply attaching the lateral vision instrument to the telebinocular in which the relations between the different parts are already optically correctly adjusted. On the other hand, the lateral vision instrument is quickly detached from the telebinocular by merely unscrewing the two knobs 25 and unhooking the rear fixed target.

In use, the person being tested is seated in front of the apparatus and the telebinocular is adjusted by means of the arm 17 so that the forehead rests against the head rest knob 30. The examiner stands in front of the person, to the right in Fig. 1, and instructs the person to fix his eyes on the fixed target 5. The examiner then rotates the knob 11 to swing the movable target around from behind the subject's head and has the subject fix his eyes on the fixed target 5 which he views just over the top of the lens assembly. Then the examiner slowly brings the movable target around until it just enters the subject's field of vision. The subject reports this to the examiner and the corresponding point is read on the scale member and recorded in degrees from the center by the position of the pointer 10. The movable target is also moved backwards from the fixed target and the subject reports the moment when the target moves out of his field of view. Thus the ability of the subject may be checked both ways and measured.

The subject cannot tell from which side the target will appear, since the movement of the movable target is controlled by the examiner who grips the knob 11 above the head of the subject. In establishing the limit of visual field of each eye in the nasal direction, the other eye is occluded. Usually the results are taken as the average of several readings. It is an important practical feature of the invention that neither the subject nor the examiner need move from one position to another during the test. The test and the recording thereof is accomplished in one sitting.

I claim:

For use with a vertically adjustable optical instrument having a vision target supporting member positioned in a far point viewing position, an attachment for said instrument for testing the lateral visual ability of a subject comprising a fixed target and a movable target, means for detachably and adjustably securing said fixed target to said target supporting member in the central optical axis of the horizontal field of view of the subject, a supporting bracket, a head rest thereon, an arm for supporting said movable target to move in a circular path in opposite directions in the said horizontal field of view about the said head rest, a rotatable hand knob on said bracket above the said head rest and connected to the said arm for moving the same as aforesaid, scale means on said bracket to measure the movement of said movable target with relation to the said fixed target, a pointer on said arm moving over the said scale means to indicate the extent of the circular movement of said movable target and means on said bracket for detachably supporting the same on the said optical instrument.

HENRY S. ALEXANDER, SR.

REFERENCES CITED

The following references are of record in the file of this patent:

UNITED STATES PATENTS

| Number | Name | Date |
| --- | --- | --- |
| 785,439 | Sayen | Mar. 21, 1905 |
| 861,913 | Stormer | July 30, 1907 |
| 1,351,221 | Shigon | Aug. 31, 1920 |
| 2,420,012 | Putnam | May 6, 1947 |